Dec. 16, 1941.  E. KOSZALKA, JR., ET AL  2,266,426
PHOTOGRAPHIC CAMERA
Filed June 1, 1939
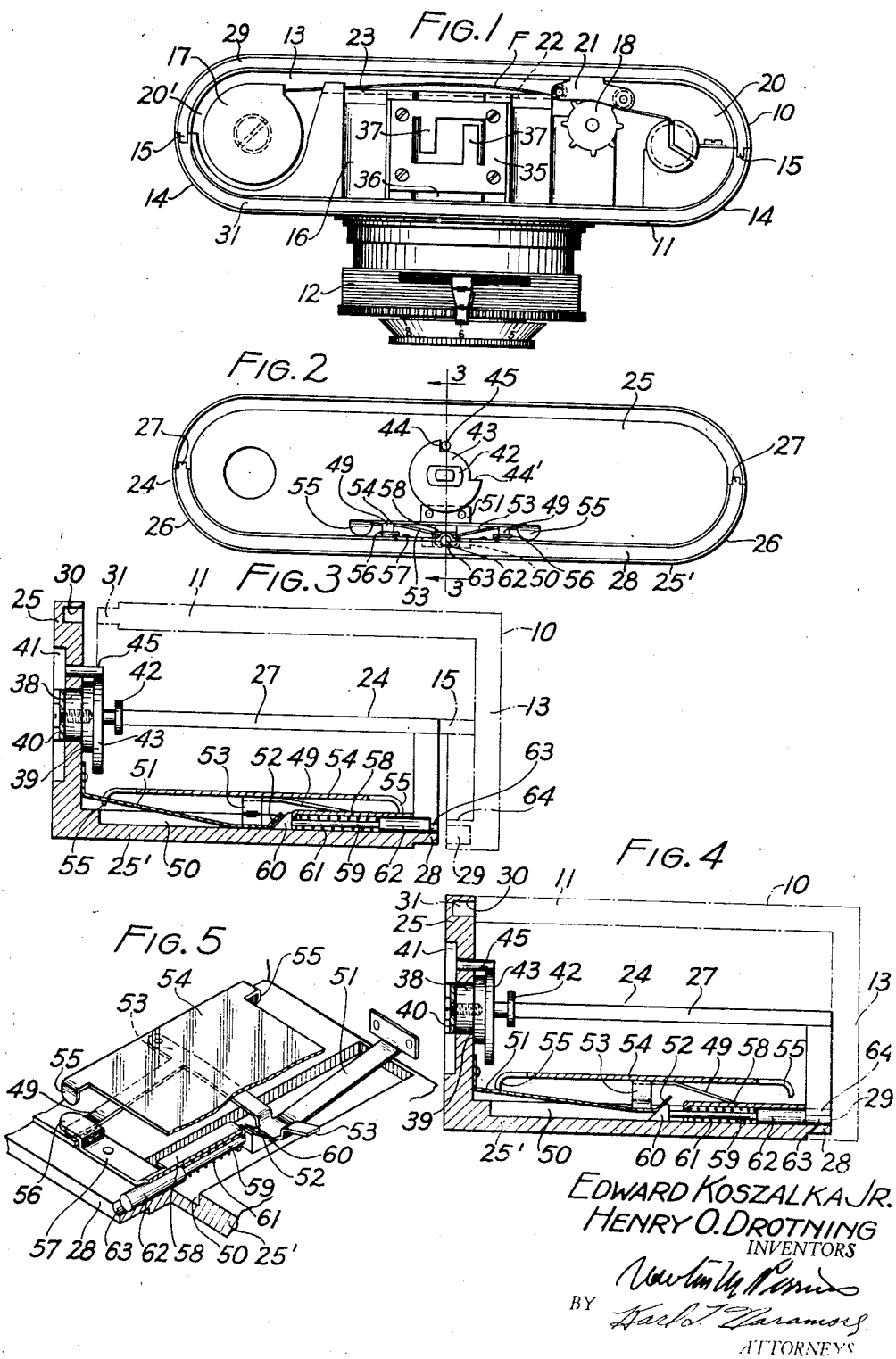
EDWARD KOSZALKA JR.
HENRY O. DROTNING
INVENTORS
BY
ATTORNEYS Patented Dec. 16, 1941

2,266,426

UNITED STATES PATENT OFFICE 2,266,426

PHOTOGRAPHIC CAMERA

Edward Koszalka, Jr., and Henry O. Drotning, Rochester, N. Y., assignors to Eastman Kodak Company, Rochester, N. Y., a corporation of New Jersey Application June 1, 1939, Serial No. 276,854

8 Claims. (Cl. 95—31)

The present invention relates to photography, and more particularly to roll film cameras having backs which are completely removable from the camera body for film loading purposes.

One object of the present invention is to provide a simple type of camera having a film back which is completely removable from a camera for the purpose of loading the camera with film. Another object is to provide such a camera in which the back is adapted to be slid laterally off the camera to be removed, which back includes a film guide which aids in positioning the film in the focal plane of the camera. Another object is to provide a film guide which is normally retracted from its film guiding position when the camera back is in any position other than completely on the camera, whereby said guide will not be in a position to scratch or buckle said film at the focal plane of the camera during its removal or replacement. And a further object is to provide a film guide which is automatically moved to its guiding position when, and only when, said back is properly placed on said camera. And yet another object is to provide a slidable plunger for moving said film guide to its guiding position, said plunger being normally inoperative and moved to an operative position when engaged by part of the camera body upon replacement of the back thereon. Another object is to provide a film guide mounting and operating means therefor with which said guide in moving to and from its guiding position is maintained substantially parallel to the focal plane of the camera, and its movement to its guiding position is limited by a part on the camera back so that its weight will not move it to said guiding position when the back is off said camera. Another object is to provide a camera of the type described which is simple in construction, efficient in operation, and easy to handle.

Briefly, our invention comprises a camera having a back which is adapted to be removed from the camera by being slid laterally thereof. The camera back includes a film guide which is adapted to be moved toward the focal plane of the camera to aid in positioning the film in said focal plane, and to prevent this guide from scratching or buckling the film during removal or replacement thereof the same is normally spring pressed to a non-operative position, which position it assumes immediately upon its removal from its proper position on a camera. So that the film guide will be automatically moved to its guiding position when the camera back is in proper position on the camera, a plunger is provided on the back which is moved upon engagement with said camera body and is adapted during such movement to move said film guide to its guiding position in the focal plane of the camera.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawing in which, Fig. 1 is a bottom view of a typical camera constructed in accordance with a preferred embodiment of the invention, and with the camera back removed, Fig. 2 is a side elevation of the interior of the camera back, Fig. 3 is an enlarged section taken substantially on line 3—3 of Fig. 2, and showing the film guide in the position it assumes when the camera back is removed from the camera body, the camera body being in turn indicated by broken lines.

Fig. 4 is the same as Fig. 3, but showing the film guide in the position it assumes when the camera back is placed on the camera, and Fig. 5 is a perspective of a part of the camera back and showing the manner of mounting said film guide in the camera back to move to and from the focal plane of the camera.

Like reference characters refer to corresponding parts throughout the drawing.

The present invention is an improvement of a similar film guide arrangement disclosed in U. S. Patent 2,186,633, issued January 9, 1940, to H. O. Drotning, and differs from said arrangement mainly in the fact that the film guide is normally moved to a non-operative position and automatically moved to a guiding position upon positioning of the back on the camera body, while in the arrangement of said pending application the film guide is normally moved to its film guiding position and retracted therefrom through actuation of the lock for the camera back. While for the purpose of illustration we have shown the invention in combination with a miniature camera of the type generally using 35-mm. film, it is to be understood that the same is adapted for use with any roll film camera having a back removable for loading purposes, and is not dependent upon the size of the camera or the type of the film used.

Referring now to Fig. 1, the camera may consist of a body portion 10, which may be made from a suitable moulded composition or from metal, including a front wall 11 on which the shutter and the lens unit 12 are mounted, and a top wall 13. The ends of the front wall are curved rearwardly, as indicated at 14, to form part of the end walls of the camera, and the ends of these curved portions are provided with a groove 15. Extending rearwardly from the rear face of the front wall 11, directly behind the lens unit, is a hollow rectangular frame 16, the rear end of said frame terminating substantially in the focal plane of the lens and constituting an exposure frame across which the film F is fed. The film F, which in this instance is shown as perforated 35-mm. film, may be wound from a retort 17, or from a film spool, journaled in a film spool chamber 20', across the exposure frame 16, over a sprocket 18, and onto a takeup spool journaled in the spool chamber 20. The takeup and supply spool are drivingly connected with the usual winding knobs, not shown, extending to the outside of the top wall 13 so that the film can be advanced for exposing purposes, and rewound into the retort after complete exposure. The sprocket 18 may be a counter sprocket usually found in cameras of this type which is operatively connected with a counter visible in the top wall of the camera so as to give a visual indication of the number of exposures made, said sprocket being advanced by the advancing film strip. The film F may be held in proper engagement with the counter sprocket by a guide member 21 which may be pivoted to the camera body so as to be raised from said sprocket during loading of the camera. For the purpose of guiding the film laterally, the rear end of the exposure frame is provided with a groove indicated at 22, which groove is the same width as the film and of a depth equal to, or slightly greater than, the thickness of the film. Thus the extreme edges of the exposure frame 16 surrounding the groove 22 form rails 23 which extend to or slightly above the top surface of the film F when the frame is correctly positioned across the exposure frame 16.

The camera back, indicated generally as 24, is adapted to be slid onto and off of the camera body 10 laterally, and constitutes the bottom wall 25 and the back wall 25' of the camera. The ends 26 of the back wall 25' are curved forwardly and provided with tongues 27 which are adapted to engage grooves 15 in the ends of the front wall of the camera body when the back is slipped onto said body, said tongue and groove connection making a light-tight joint. The light-tight connection between the camera back and body portions at the other points of division are provided for by having a tongue 28 at the free edge of the back wall 25' which is adapted to engage a groove 29 around the edge of the top wall 13, and having a groove 30 around the edge of the bottom wall 25 which is adapted to receive a tongue 31 around the edge of the front wall of the camera body. The bottom wall of the camera back 24 may be provided with a circular recess into which a trunnion of the retort 14 may extend to rotatably support the same at both ends.

The means for locking the camera back on the camera body comprises a catch plate 35 fixed over a recess 36 in the frame 16 on the camera body, said catch plate being formed so as to have two substantially resilient fingers 37 between which the catch member on the camera back engages to lock the two parts together. The camera back is provided with a catch member comprising a stud 38 extending through and rotatably mounted relative to the bottom wall of the camera back. The stud is held against longitudinal movement relative to the wall 25 by virtue of the shoulder 39 engaging the inside face of said wall, and the key member 40 screwed to the end of the stud and resting in a recess 41 formed in the outside face of the bottom wall. The inner end of the stud 38 is provided with a catch member 42 which is adapted, when in a vertical position, to extend between the fingers 37 on the catch plate 35, and into recess 36; and when turned to the position shown in Fig. 2 is adapted to extend across said fingers of the catch plate to prevent the back from being slid off of the camera. The catch member 42 is turned from the outside of the camera body by means of the key member 40 fixed to the stud 38, and the base of the recess may be marked with the words, "lock," and, "open," to indicate the condition of the catch by the position of the key member. A stop member 43 is carried by the stud 38 within a camera wall and includes two shoulders 44 and 44' which are adapted to engage a pin 45 extending from the camera wall for positively limiting rotation of the stud 38 in either of its two positions.

It is common in roll film cameras to provide a spring pressed film pad on the camera back which is adapted to press against and hold the film flat in the focal plane when the camera back is placed on the camera. These film pads are usually connected to the camera back by means of springs which normally urge them away from the back and toward the focal plane of the camera. Such film pads are satisfactory with cameras having hinged backs where the pads will be normally moved down against the rear face of the film when the back is closed, but are not so satisfactory with cameras having backs which are slid off and onto the camera body laterally as in the camera shown. Referring to Fig. 1 it will be noticed that the portion of the film F above the exposure frame 16 is slightly bowed above the same instead of being flat in the groove 22 formed therein. This generally is the condition of the film strip at the time of threading, and it will be appreciated that if the present camera back, which is slid laterally onto the camera body, were provided with the usual type of film pad which is normally extended into or below the focal plane of the camera, that the edge of such pad would, undoubtedly, engage the edge of the film strip when the back was slid onto the camera body thus causing a buckling of the film and a resistance to the replacement of the back onto the camera. The particular film guide arrangement constituting the present invention is designed to overcome this difficulty and still provides a film guide which will properly locate the film in the focal plane of the camera when the back is on. The arrangement also shows the film guide normally spring pressed away from the focal plane of the camera and automatically moved to a film guiding position by a slidable plunger which is in turn operated upon engagement with the camera body.

The particular type of camera described is essentially the same as shown in pending application Serial Number 231,377, Henry O. Drotning, filed September 23, 1938, and forms no part of the present invention. The present invention is directed to a particular film guide arrangement designed for use with this type of camera and will be described hereinafter.

Referring now to Figs. 2–5 the back wall 25' is provided with a recess 50 extending laterally of said wall substantially across the width thereof. A spring member 51 is fastened at one end to the bottom wall 25 of the camera and is so formed that the free end thereof having an inclined portion 52 thereon extends into said recess 50 and is normally moved toward the bottom thereof. Formed on the free end of the spring member are a pair of wings 53 extending out of said recess longitudinally of said back wall 25', and to the ends of which a film guide 54 is fastened by any suitable means such as rivets. This film guide 54 is provided at each corner with turned-up tabs 55 which are adapted to engage rails 23 on the exposure frame 16 when the guide is moved to its guiding position to form a film channel at the focal plane thru which the film is guided.

It will be readily understood that the film guide will be normally moved away from the focal plane of the camera when the back is in any position other than that where it is completely on the camera body due to the resiliency of the spring member 51 so that during the time the back is being slid off from, or being slid onto, the camera body said film guide is sufficiently removed from the focal plane whereby it will not engage the film strip to scratch or buckle the same during the sliding movement of the back. To assist in normally moving the film guide away from the focal plane and to prevent the film guide from being accidentally bent down below the focal plane when the back is off of the camera each of the wings 53 is provided with an arm 49 extending laterally of the back wall 25' adjacent the free edge thereof. The free end of each of these arms 49 is confined by a raised end 56 on a guide member 57 fastened to the back wall 25', see Fig. 5. Each of the arms 49 are bent so that their normal tendency is to assist the spring member 51 in normally moving the film guide 54 away from the focal plane of the camera. Another, and probably the main, function of these arms 49 is to prevent the film guide 54 from being accidentally moved, or from dropping due to gravity, to a position below the focal plane of the camera when the back is off of the camera, in which position the guide would engage, and buckle, the edge of the film strip in the focal plane when the back was slipped onto the camera.

For automatically moving the film guide 54 to its guiding position when the back is placed on the camera the following structure is provided. Slidably mounted on the camera back in the recess 50 is a plunger 59. The plunger is guided by a housing portion 58 of the guide member 57 and is provided with a cam end 60 adapted to engage the inclined portion 52 of the spring member 51. This plunger 59 is normally moved to an inoperative position, see Fig. 3, by a coiled spring 61, in which position the cam end 60 is removed from the inclined portion 52 so that the combined, normal action of spring member 51 itself and the arms 49 thereof is allowed to move the film guide from its guiding position. When the plunger 59 is pressed inward against the action of the coiled spring 61 the cam end 60 engages the inclined portion 52 of the spring member 51 and serves to move said spring member, and along with it the film guide, toward the focal plane of the camera wherein said film guide cooperates with the exposure frame 16 in the camera to form the desired film guiding channel. So that depression of the plunger 59 will be automatically effected when the back is placed on the camera the end 62 of the plunger is guided in a groove 63 in the tongue 28 of back wall 25'. It will be noticed by referring to Figs. 3 and 4, that the end 62 of the plunger is adapted to extend above the extremity of the tongue 28, and into the path of one wall 64 of the groove 29 in the camera body adapted to receive said tongue, whereby when the back is slid onto the camera said plunger will be engaged by the camera body and movement of the back onto the camera will serve to depress said plunger. The parts are so arranged that the plunger 59 will not be sufficiently moved to move the film guide to its full guiding position until the back is entirely on the camera, whereby engagement between the guide and film is prevented during any movement of the back relative to the camera body to prevent scratching or buckling of the film.

The present arrangement provides a film guide of the type described which is automatically moved to its guiding position when the back is completely placed on the camera, and in which said film guide is moved from its guiding position the instant the back is moved in a direction to remove it from the camera, whereby injury to the film by the moving back is absolutely prevented. The arrangement is very simple in construction and at the same time efficient in operation. The particular arrangement of parts provides for the film guide in moving between its two positions passing thru substantially parallel planes to prevent a binding action which might occur if one edge of the guide reached its guiding position ahead of another edge. The film guide is automatically moved to its guiding position by the motion of the back in moving to its position on the camera so that no separate or individual operation is required to effect this desired movement of the guide.

While we have shown and described one specific embodiment of the present invention, we are aware that many modifications thereof are possible. Our invention, therefore, is not to be restricted except in so far as necessitated by the prior act and the spirit of the appended claims.

Having thus described our invention, what we declare is new and desire to secure by Letters Patent is:

1. In a roll film camera, the combination with a camera body, means at one side of said body for supporting a supply roll of unexposed film, means at the other side of said body for supporting a take-up roll for winding film from said supply roll, and an exposure frame between said rolls across which the film is advanced in the focal plane of the camera, of a camera back completely removable from said camera body for loading purposes, means for locking said back on the camera body, a film guide carried by said camera back and movable to and from a guiding position wherein it cooperates with said exposure frame when said back is on said camera body to form a film channel at the focal plane of the camera, means on said camera back for moving said film guide to and from its guiding position, and including an actuating member movably mounted on said back and adapted to engage a stationary part of said camera body when said back is placed thereon, whereby said film guide is moved to and from its guiding position when said back is placed on and removed from said camera body, respectively.

2. In a roll film camera, the combination with a camera body, means at one side of said body for supporting a supply roll of unexposed film, means at the other side of said body for supporting a take-up roll for winding film from said supply roll, and an exposure frame between said rolls across which the film is advanced in the focal plane of the camera, of a camera back completely removable from said camera body for loading purposes, means for locking said back on the camera body, a film guide carried by said camera back and movable to and from a guiding position wherein it cooperates with said exposure frame when said back is on said camera body to form a film-channel at the focal plane of the camera, means normally moving said film guide from said operative position, and actuating means movably mounted on said camera back separate from and operatively associated with said film guide and adapted to be automatically actuated when said back is placed on said camera to move said guide into its guiding position from its normal position.

3. In a roll film camera, the combination with a camera body, means at one side of said body for supporting a supply roll of unexposed film, means at the other side of said body for supporting a take-up roll for winding film from said supply roll, and an exposure frame between said rolls across which the film is advanced in the focal plane of the camera, of a camera back completely removable from said camera body for loading purposes, means for locking said back on the camera body, a film guide carried by said camera back and movable to and from a guiding position wherein it cooperates with said exposure frame to form a film channel at the focal plane of the camera, means normally forcing said film guide from its guiding position, and means for moving said film guide to its guiding position when said back is placed on said camera body, said means including an actuating member mounted on said back to move between an operative position, wherein it engages and moves said film guide to its guiding position, and a normal inoperative position, wherein it is disengaged from said film guide, said actuating member arranged on said camera back whereby it is adapted to engage a fixed part of said camera body and be moved to said operative position when said back is placed on said camera.

4. In a roll film camera, the combination with a camera body, means at one side of said body for supporting a supply roll of unexposed film, means at the other side of said body for supporting a take-up roll for winding film from said supply roll, and an exposure frame between said rolls across which the film is advanced in the focal plane of the camera, of a camera back completely removable from said camera body for loading purposes, means for locking said back on the camera body, a film guide carried by said camera back and movable to and from a guiding position wherein it cooperates with said exposure frame to form a film channel at the focal plane of the camera, a spring member on said camera back and carrying said film guide to normally force the same from its guiding position, and means for automatically moving said film guide to its guiding position when said back is placed on said camera body, said means including an actuating member mounted on said back to move between an operative position, wherein it engages and retracts said spring member and along with it said film guide from their normal positions, and a normal inoperative position, wherein it disengages said spring member, said actuating member arranged on said camera back whereby it is adapted to engage a fixed part of said camera body and be moved to its operative position when said back is placed on said camera body.

5. In a roll film camera, the combination with a camera body, means at one side of said body for supporting a supply roll of unexposed film, means at the other side of said body for supporting a take-up roll for winding film from said supply roll, and an exposure frame between said rolls across which the film is advanced in the focal plane of the camera, of a camera back completely removable from said camera body for loading purposes, means for locking said back on the camera body, a film guide carried by said camera back, means for attaching said film guide in said camera back whereby it is movable to and from a guiding position wherein it cooperates with said exposure frame to form a film channel at the focal plane of the camera, and is normally moved from said guiding position, said means including a spring member fixed to said back and carrying said film guide, a plunger slidably mounted on said back to move between an operative position, wherein it engages and retracts said spring member and along with it said film guide from their normal positions, and a normal inoperative position wherein it disengages said spring member, said plunger arranged on said back whereby it is adapted to engage a fixed part of said camera body and be moved to said operative position when the back is placed on the camera body.

6. In a roll film camera, the combination with a camera body, means at one side of said body for supporting a supply roll of unexposed film, means at the other side of said body for supporting a take-up roll for winding film from said supply roll, and an exposure frame between said rolls across which the film is advanced in the focal plane of the camera, of a camera back completely removable from said camera body for loading purposes, means for locking said back on the camera body, a film guide carried by said camera back, means for attaching said film guide in said camera back whereby it is movable to and from a guiding position wherein it cooperates with said exposure frame to form a film channel at the focal plane of the camera, and is normally moved from said guiding position, said means including a spring member fixed at one end to said back and at the other end to said film guide at spaced points thereon whereby flexing of said spring member is adapted to move said film guide through parallel planes, means on said camera back for limiting the movement of said film guide in a direction away from its normal position, and means adapted to move said film guide into its guiding position when said camera back is placed on said camera body, said means including a spring pressed plunger slidably mounted on said back to move between an operative position, wherein it engages and retracts said spring member, and a normal inoperative position wherein it disengages said spring member and is adapted to engage a fixed part of said camera body and be moved to an operative position by such engagement when said back is placed on the camera body.

7. In a roll film camera, the combination with a camera body including a front wall, a top wall, and two end walls, means at one side of said body for supporting a supply roll of film, means at the other end of said body for supporting a take-up roll for winding film from said supply roll, and an exposure frame between said rolls and parallel to said front wall across which the film is advanced in the focal plane of the camera, of a camera back completely removable from said camera body for loading purposes, means for locking said back on the camera body, said back including the bottom wall and back wall of the camera and adapted to slide onto and off of said body laterally thereof, a film guide carried by said camera back, means for attaching said film guide in said camera back whereby it is movable to and from a guiding position wherein it cooperates with said exposure frame to form a film channel at the focal plane of the camera, said means including a spring member fixed at one end to the camera back, the free end of said spring member normally moved toward said back wall and carrying said film guide whereby said guide is normally moved from said guiding position, a spring pressed plunger slidably mounted on said back between an operative position, wherein it is adapted to engage and retract said spring member and along with it said film guide from their normal positions, and a normal inoperative position, wherein it disengages said spring member, said plunger arranged on said back whereby it is adapted to engage a fixed part of said camera body and be moved to said operative position when the back is placed on the camera body, and a member on said back engaging and limiting the movement of said spring member from its retracted position and adapted to guide said plunger.

8. In a roll film camera, the combination with a camera body including a front wall, a top wall, and two end walls, means at one side of said body for supporting a supply roll of film, means at the other end of said body for supporting a take-up roll for winding film from said supply roll, and an exposure frame between said rolls and parallel to said front wall across which the film is advanced in the focal plane of the camera, of a camera back completely removable from said camera body for loading purposes, means for locking said back on the camera body, said back including the bottom wall and back wall of the camera and adapted to slide onto and off of said body laterally thereof, said back wall of the back provided with a recess extending laterally thereof, a spring member fixed at one end to said camera back with the free end thereof extending into said recess and normally moved toward the bottom thereof, a film guide fixed to the free end of said spring member and adapted to move to and from a guiding position wherein it cooperates with said exposure frame to form a film channel at the focal plane of the camera, the free end of said spring member including a pair of arms and an inclined portion projecting laterally of the back wall of said back and toward the free edge thereof, a plunger slidably mounted on said back and including a cam adapted to engage said inclined portion of said back and move said spring member from its normal position and along with its said film guide to its guiding position, said plunger normally spring pressed to a position wherein it disengages said spring member and located on said back whereby it is adapted to engage said camera body when the back is placed thereon and be moved to a spring member engaging position by movement of the back, and a guide member fixed to said camera back and including a part forming a guide for said plunger and its actuating spring, and parts adapted to engage said arms on said spring member to limit the amount of movement of said spring member away from its normal position.

EDWARD KOSZALKA, Jr.
HENRY O. DROTNING.